(12) United States Patent
Uh et al.

(10) Patent No.: US 6,795,154 B2
(45) Date of Patent: Sep. 21, 2004

(54) APPARATUS FOR CUTTING LIQUID CRYSTAL DISPLAY PANELS AND CUTTING METHOD USING THE SAME

(75) Inventors: Ji-Heum Uh, Seoul (KR); Sang-Sun Shin, Kyongsangbuk-do (KR)

(73) Assignee: LG. Philips LCD Co., Ltd., Seoul (KR)

(*) Notice: Subject to any disclaimer, the term of this patent is extended or adjusted under 35 U.S.C. 154(b) by 85 days.

(21) Appl. No.: 10/327,199

(22) Filed: Dec. 24, 2002

(65) Prior Publication Data

US 2003/0155392 A1 Aug. 21, 2003

(30) Foreign Application Priority Data

Feb. 19, 2002 (KR) .................................. P2002-0008806

(51) Int. Cl.$^7$ ........................ G02F 1/1333; H01L 21/00
(52) U.S. Cl. .......................... 349/158; 349/187; 438/33
(58) Field of Search ............................. 349/158, 187; 438/33, 113, 418, 464; 225/96.5; 83/885

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |

(List continued on next page.)

FOREIGN PATENT DOCUMENTS

| | | |
|---|---|---|
| EP | 1 003 066 | 5/2000 |
| JP | 2000-338501 | 12/0000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-19522 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |

(List continued on next page.)

OTHER PUBLICATIONS

U.S. patent application No. 10/126,939.

Primary Examiner—Robert H. Kim
Assistant Examiner—Mike Qi
(74) Attorney, Agent, or Firm—Morgan, Lewis & Bockius LLP

(57) ABSTRACT

An apparatus for cutting liquid crystal display panels and a cutting method using the same are disclosed in the present invention. The apparatus includes a first scribing unit sequentially forming a plurality of first scribing lines on surfaces of first and second mother substrates having unit liquid crystal display panels and cutting the first and second mother substrates along the first scribing lines, a first turning unit turning the cut first and second mother substrates by 90°, and at least two second scribing units sequentially forming a plurality of second scribing lines on the surfaces of the first and second mother substrates and cutting the first and second mother substrates along the second scribing lines.

6 Claims, 10 Drawing Sheets

U.S. PATENT DOCUMENTS

| | | | |
|---|---|---|---|
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,470,782 B1 * | 10/2002 | Shimotoyodome et al. | ... 83/879 |
| 6,580,489 B2 * | 6/2003 | Choo et al. | ................. 349/187 |
| 6,590,181 B2 * | 7/2003 | Choo et al. | ................. 219/121 |
| 2001/0021000 A1 | 9/2001 | Egami | |
| 2003/0147035 A1 * | 8/2003 | Chae et al. | ................. 349/158 |
| 2003/0151717 A1 * | 8/2003 | Shin | ........................ 349/158 |
| 2004/0040997 A1 * | 3/2004 | Ueyama et al. | ............ 225/96.5 |

FOREIGN PATENT DOCUMENTS

| | | |
|---|---|---|
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-12538 | 5/1998 |
| JP | 10-123537 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |

| | | | | | |
|---|---|---|---|---|---|
| JP | 2002-122873 | 4/2002 | JP | 2002-214626 | 7/2002 |
| JP | 2002-139734 | 5/2002 | KR | 2000-0035302 | 6/2000 |
| JP | 2002-202512 | 7/2002 | | | |
| JP | 2002-202514 | 7/2002 | * cited by examiner | | |

APPARATUS FOR CUTTING LIQUID CRYSTAL DISPLAY PANELS AND CUTTING METHOD USING THE SAME

This application claims the benefit of the Korean Patent Application No. P2002-008806 filed on Feb. 19, 2002, which is hereby incorporated by reference.

BACKGROUND OF THE INVENTION

1. Field of the Invention

The present invention relates to a cutting apparatus, and more particularly, to an apparatus for cutting liquid crystal display panels and a cutting method using the same. Although the present invention is suitable for a wide scope of applications, it is particularly suitable for substantially reducing a process time in fabricating a liquid crystal display panel.

2. Discussion of the Related Art

A liquid crystal display device provides liquid crystal cells arranged in a matrix form with corresponding data signals according to image information in order to display a desired image by controlling light-transmittance of each liquid crystal cell. In order to improve yield, a method of fabricating the liquid crystal display device includes the steps of forming thin film transistor array substrates on a large mother substrate, forming color filter substrates on another mother substrate, bonding the two mother substrates to each other to form a plurality of liquid crystal display panels at the same time. Hence, the method demands a process of cutting the bonded mother substrates into unit liquid crystal display panels.

Such a cutting process of the unit panels generally includes forming a scribing line on a mother substrate by using a diamond pen having hardness greater than that of glass, and cutting the substrate by applying a mechanical force thereto. Such a cutting process of the unit panels will now be explained in detail by referring to the attached drawings as follows.

FIG. 1 illustrates a schematic layout of a related art unit liquid crystal display panel prepared by bonding a thin film transistor array substrate and a color filter substrate to each other.

Referring to FIG. 1, a liquid crystal display panel 10 includes an image display part 13 having liquid crystal cells arranged in a matrix form, a gate pad part 14 connected to gate lines of the image display part 13, and a data pad part 15 connected to data lines. In this case, the gate and data pad parts 14 and 15 are respectively formed on the edge areas of a thin film transistor array substrate 1 which does not overlap a color filter substrate 2. The gate pad part 14 provides the gate lines of the image display part 13 with each corresponding scan signal supplied from a gate driver integrated circuit, and the data pad part 15 provides the data lines with image information supplied from a data driver integrated circuit.

On the thin film transistor array substrate 1 of the image display unit 13, the data lines having the image information applied thereto and the gate lines having the scan signals applied thereto are arranged to vertically cross each other. Thin film transistors at each intersection are formed to switch the liquid crystal cells. Pixel electrodes are connected to the thin film transistors to drive the liquid crystal cells. A passivation layer is formed on the entire surface to protect the electrodes and the thin film transistors.

Moreover, color filters separated by a black matrix for each cell area are formed on the color filter substrate 2. A transparent common electrode as a counter electrode of the pixel electrode is formed on the thin film transistor array substrate 1.

A cell gap is provided between the thin film array substrate 1 and the color filter substrate 2, which are bonded to each other by a sealing part (not shown) formed at the periphery of the image display unit 13, so as to be spaced apart from each other. A liquid crystal layer (not shown) is formed in the space between the thin film transistor array substrate 1 and the color filter substrate 2.

FIG. 2 illustrates a cross-sectional view of a first mother substrate having thin film transistor array substrates 1 and a second mother substrate having color filter substrates 2, wherein the first and second mother substrates are bonded to each other to form a plurality of liquid crystal display panels.

Referring to FIG. 2, each unit liquid crystal display panel has a thin film transistor array substrate longer than a corresponding color filter substrate 2. This is because the gate and data pad parts 14 and 15 are formed at the corresponding edges of the thin film transistor array substrate 1 which does not overlap the color filter substrate 2, as shown in FIG. 1.

Hence, the second mother substrate 30 and the color filter substrates 2 formed thereon are spaced apart from each other by a dummy area 31 corresponding to the protruding area of each thin film transistor array substrate 1 on the first mother substrate 20.

Moreover, the unit liquid crystal display panels are arranged so as to maximize the use of the first and second mother substrates 20 and 30. Although it depends on models, the unit liquid crystal display panel is generally spaced apart from each other at a distance corresponding to the area of the other dummy area 32.

After the first mother substrate 20 having the thin film transistor array substrates 1 is bonded to the second mother substrate 30 having the color filter substrates 2, a scribing process and a breaking process are carried out to individually cut the liquid crystal display panels. In this case, the dummy area 31 formed between each color filter substrate 2 of the second mother substrate 30 and the other dummy area 32 formed between each unit liquid crystal display panel are removed at the same time.

The related art cutting process of the unit liquid crystal display panels is explained in detail by referring to FIGS. 3A to 3J as follows.

Referring to FIG. 3A, first and second mother substrates 20 and 30 bonded to each other are loaded on a first table 33.

In FIG. 3B, the first table 33 moves in one direction to a previously set distance to sequentially form a first scribing line 42 on the first mother substrate 20 through a cutting wheel 41.

Referring to FIG. 3C, the first and second mother substrates 20 and 30 are turned by 90°. The first table 33 moves back to its initial location at the previously set distance to sequentially form a second scribing line 43 on a surface of the first mother substrate 20 through the cutting wheel 41.

As shown in FIG. 3D, the first and second mother substrates 20 and 30 are overturned and are loaded on a second table 34. The second table 34 moves in one direction at a previously set distance, and propagates a crack on the first mother substrate 20 by pressing the second mother substrate 30 with a breaking rod 44 along the second scribing line 43.

As shown in FIG. 3E, after the second and first mother substrates 30 and 20 are turned by 90°, the second table 34 moves back to its initial location at the previously set distance, and propagates a crack on the first mother substrate 20 by pressing the second mother substrate 30 along the first scribing line 42 with the breaking rod 44.

As shown in FIG. 3F, after the second and first mother substrates 30 and 20 are loaded on a third table 35, the third table 35 moves in one direction at a previously set distance to sequentially form a third scribing line 46 on the surface of the second mother substrate 30 through a cutting wheel 45.

Referring to FIG. 3G, the second and first mother substrates 30 and 20 are turned by 90°, and the third table 35 moves back to its initial location at the previously set distance to form a fourth scribing line 47 on the surface of the second mother substrate 30 through the cutting wheel 45.

As shown in FIG. 3H, the second and first mother substrates 30 and 20 are overturned to be loaded on a fourth table 36. The fourth table 36 moves in one direction at a previously set distance and propagates a crack on the second mother substrate 30 by pressing the first mother substrate 20 with a breaking rod 48 along the fourth scribing line 47.

In FIG. 3I, after the first and second mother substrates 20 and 30 are turned by 90°, the fourth table 36 moves back to its initial location at the previously set distance and propagates a crack on the second mother substrate 30 by pressing the first mother substrate 20 along the third scribing line 46 with the breaking rod 48.

Referring to FIG. 3J, the first and second mother substrates 20 and 30 are cut into unit liquid crystal display panels as the cracks are propagated along the first to fourth scribing lines 42, 43, 46, and 47 on the first and second mother substrates 20 and 30. The unit liquid crystal display panels are selectively unloaded using a suction plate 49 to be transferred to equipments for a following process.

However, the related art apparatus and method for cutting the liquid crystal display panels turn the first and second mother substrates four times and overturn the first and second mother substrates twice, whereby the apparatus becomes complicated, and the method takes too much time for the scribing, breaking, turning, and overturning steps.

SUMMARY OF THE INVENTION

Accordingly, the present invention is directed to an apparatus for cutting liquid crystal display device panels and a cutting method using the same that substantially obviate one or more of problems due to limitations and disadvantages of the related art.

Another object of the present invention is to provide an apparatus for cutting liquid crystal display panels and a cutting method using the same to minimize a processing time taken for cutting the first and second mother substrates into unit liquid crystal display panels.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for cutting liquid crystal display panels includes a first scribing unit sequentially forming a plurality of first scribing lines on surfaces of first and second mother substrates having unit liquid crystal display panels and cutting the first and second mother substrates along the first scribing lines, a first turning unit turning the cut first and second mother substrates by 90°, and at least two second scribing units sequentially forming a plurality of second scribing lines on the surfaces of the first and second mother substrates and cutting the first and second mother substrates along the second scribing lines.

In another aspect of the present invention, a method for cutting liquid crystal display panels includes sequentially forming a plurality of first scribing lines on surfaces of first and second mother substrates having unit liquid crystal display panels, cutting the first and second mother substrates along the first scribing lines, turning the cut first and second mother substrates by 90°, forming a plurality of second scribing lines on the surfaces of the first and second mother substrates, and cutting the first and second mother substrates along the second scribing lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 4:
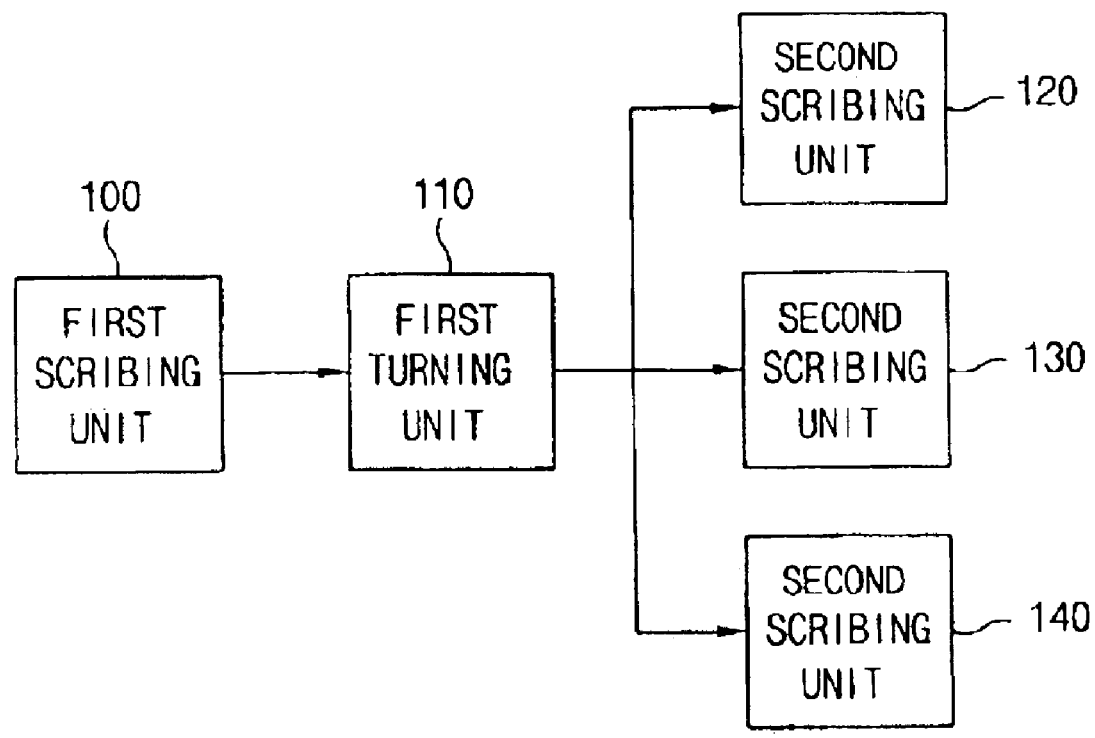
FIG. 4 illustrates a block diagram of an apparatus for cutting liquid crystal display panels according to a first embodiment of the present invention.

FIG. 4 illustrates a block diagram of an apparatus for cutting liquid crystal display panels according to a first embodiment of the present invention.

Referring to FIG. 4, an apparatus for cutting liquid crystal display panels according to the first embodiment of the present invention includes a first scribing unit 100 sequentially forming a first scribing line on the surfaces of first and second mother substrates having unit liquid crystal display panels and cutting the first and second mother substrates along the first scribing line, a first turning unit 110 turning the cut first and second mother substrates by 90°, and three second scribing units 120, 130, and 140 connected in parallel to the first turning unit 110 to cut the first and second mother substrates. The first and second mother substrates are cut by the first scribing unit 100, turned by the first turning unit 110, loaded to sequentially form a second scribing line on the surfaces of the first and second mother substrates, and separated along the second scribing line. For breaking processes, various methods may be applicable after the scribing process. The breaking processes were disclosed in U.S. patent application Ser. Nos. 10/126,939 and 10/126,698, which are incorporated by reference.

Figure 5A:
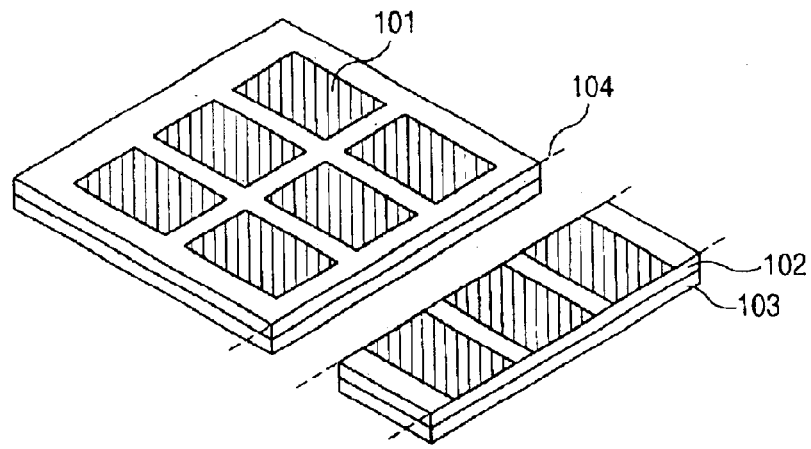
FIGS. 5A to 5C illustrate perspective views of a sequential process carried out in each block of FIG. 4.
Figure 5B:
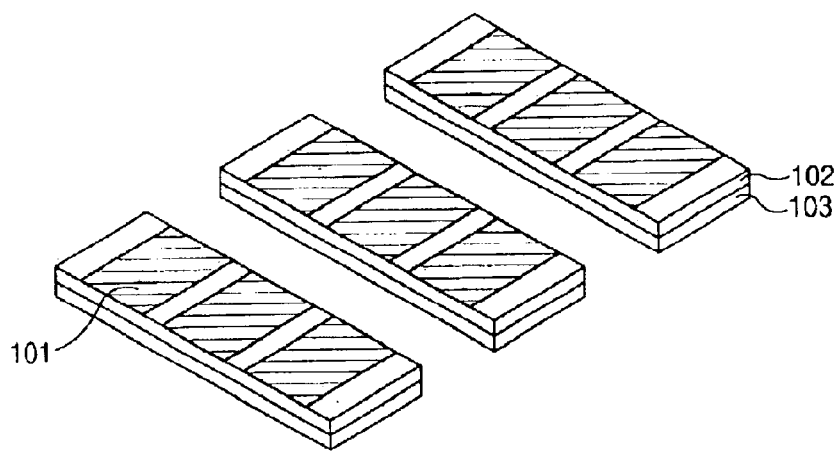
Figure 5C:
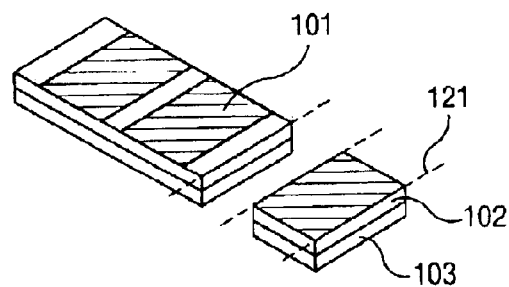

FIGS. 5A to 5C illustrate perspective views of a sequential process carried out in each block of FIG. 4.

Referring to FIG. 5A, the first scribing unit 100 sequentially forms the first scribing line 104 on the surfaces of the first and second mother substrates 102 and 103 having the unit liquid crystal display panels 101 formed thereon to be spaced apart from each other and cuts the first and second mother substrates 102 and 103 along the first scribing line 104.

For example, since the first embodiment of the present invention is related to a model having nine unit liquid crystal display panels formed on the first and second mother substrates 102 and 103, the first scribing unit 100 divides the first and second mother substrates 102 and 103 into three equally divided parts by six scribing processes.

A plurality of thin film transistor array substrates (not shown) are formed on the first mother substrate 102 to be spaced apart from each other. A plurality of color filter substrates are formed on the second mother substrate 103 to be spaced apart from each other. And, the thin film transistor array substrates, and the color filter substrates are bonded to each other, thereby forming a plurality of unit liquid crystal display panels 101.

Figure 1:
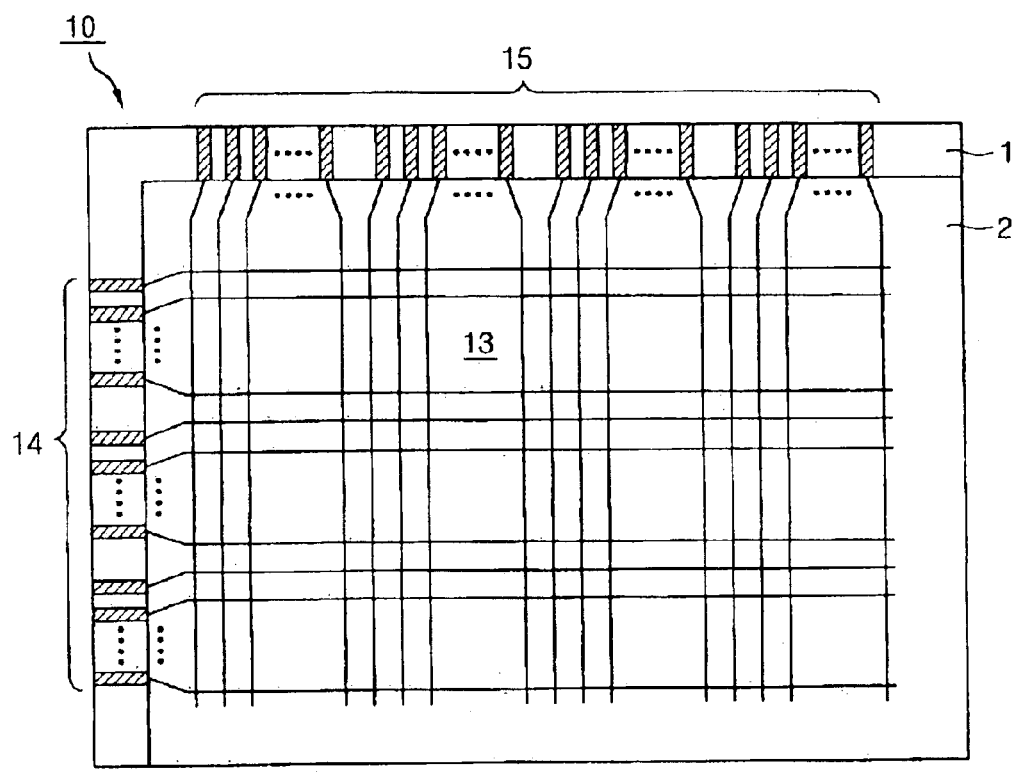
FIG. 1 illustrates a schematic layout of a related art unit liquid crystal display panel prepared by bonding a thin film transistor array substrate and a color filter substrate to each other.
Figure 2:
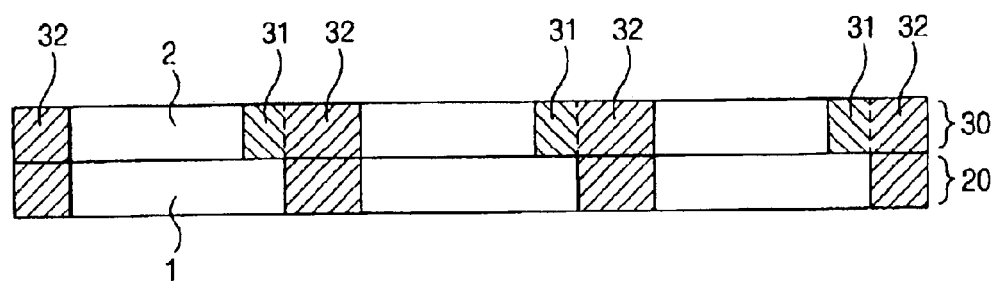
FIG. 2 illustrates a cross-sectional view of a first mother substrate having thin film transistor array substrates and a second mother substrate having color filter substrates according to a related art, wherein the first and second mother substrates are bonded to each other to construct a plurality of liquid crystal display panels.
Figure 3A:
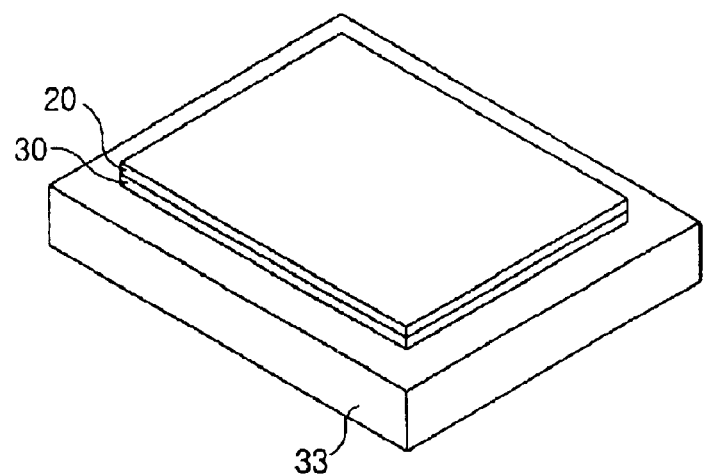
FIGS. 3A to 3J illustrate perspective views of a related art cutting process of unit liquid crystal display panels.
Figure 3B:
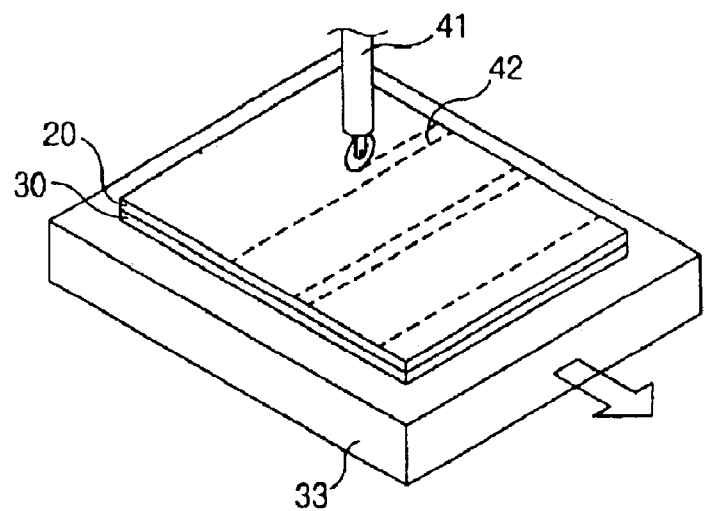
Figure 3C:
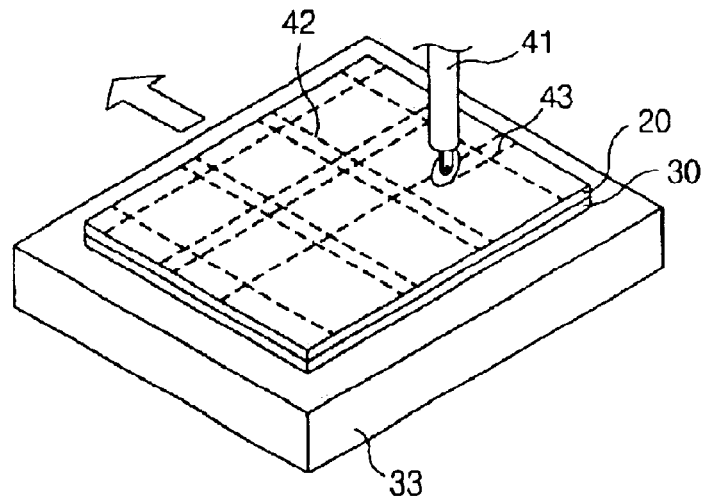
Figure 3D:
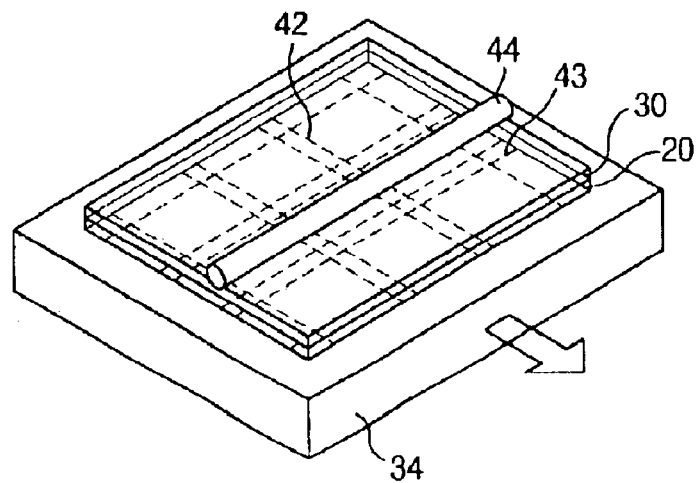
Figure 3E:
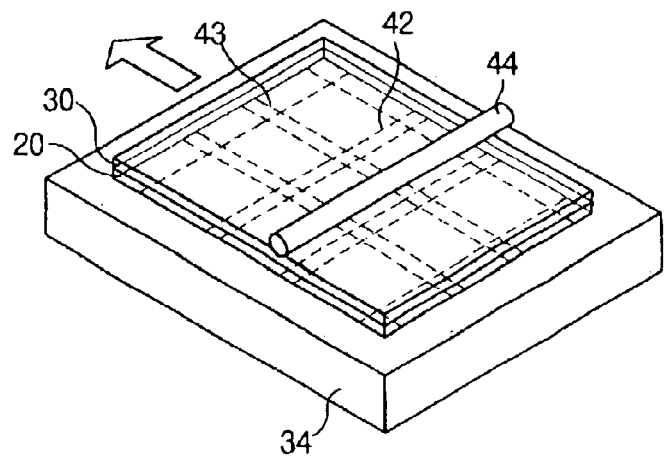
Figure 3F:
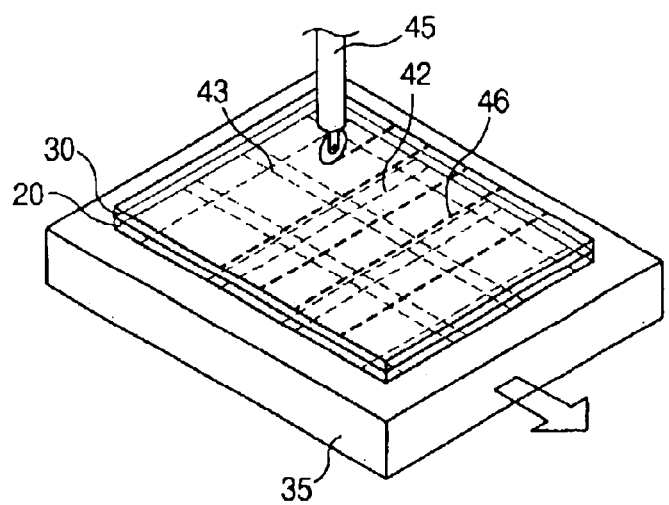
Figure 3G:
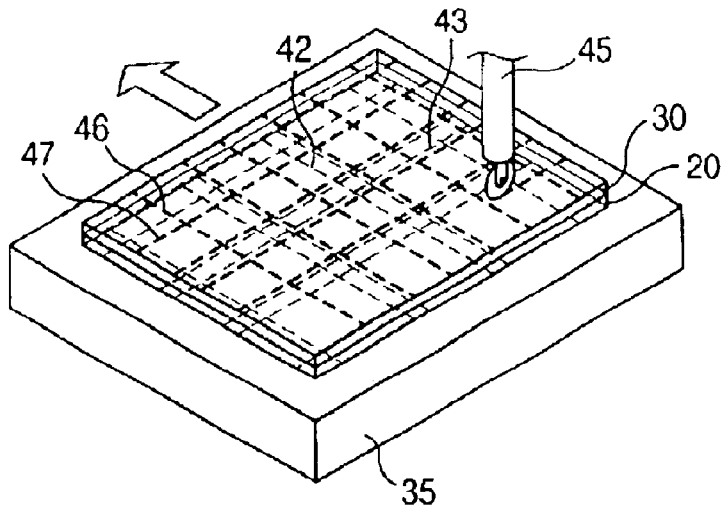
Figure 3H:
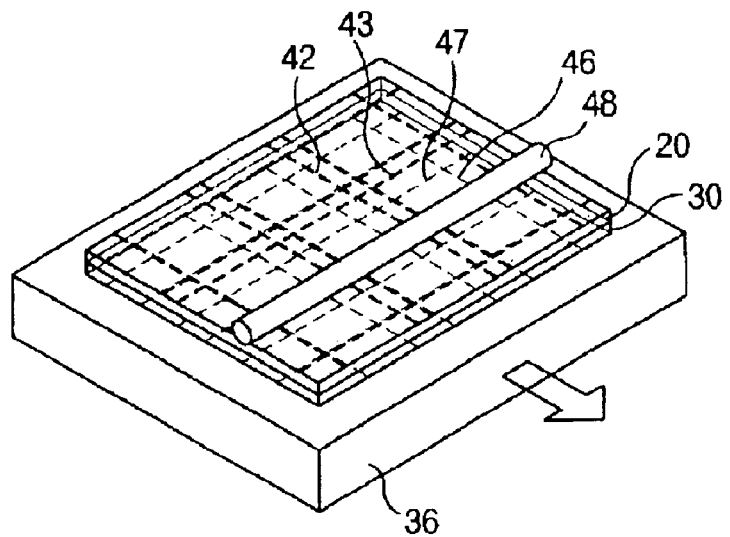
Figure 3I:
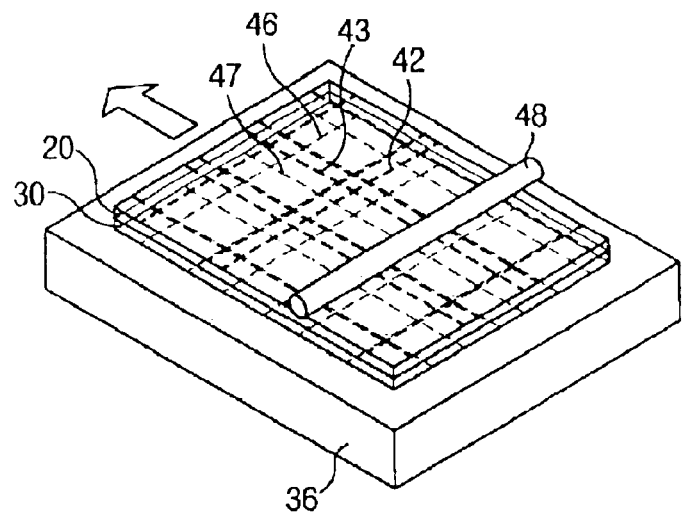
Figure 3J:
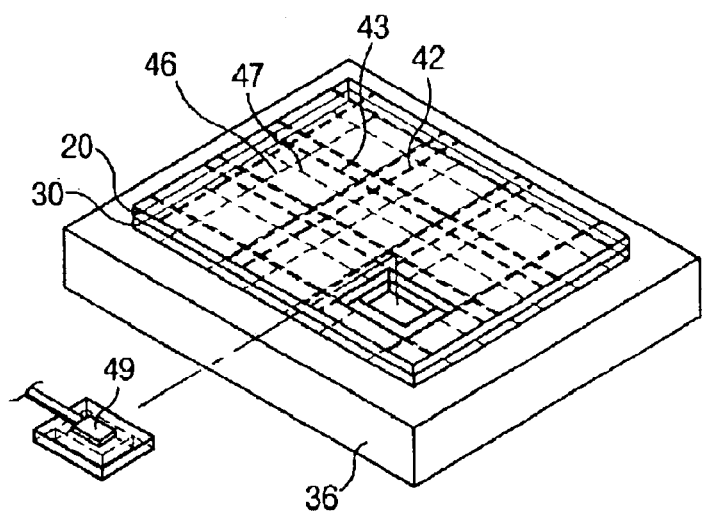

Meanwhile, each of the thin film transistor array substrates of the first mother substrate 102 is longer than that of each corresponding color filter substrate of the second mother substrate 103. As shown in FIGS. 1 and 2, this is because the gate and data pad parts are formed at the corresponding edges of the thin film transistor array substrate that does not overlap the corresponding color filter substrate.

Referring to FIG. 5B, the first turning unit 110 respectively turns each of the three equally divided parts of the first and second mother substrates 102 and 103 cut by the first scribing unit 100 by 90°.

Referring to FIG. 5C, the turned three equally divided parts of the first and second mother substrates 102 and 103 are loaded on the second scribing units 120, 130, and 140, respectively. The second scribing units 120, 130, and 140 then sequentially form a second scribing line 121 on the surfaces of the first and second mother substrates 102 and 103, and cut the first and second mother substrates 102 and 103 along the second scribing line 121 to form nine unit liquid crystal display panels 101.

Since the first embodiment of the present invention related to a model having nine unit liquid crystal display panels formed on the first and second mother substrates 102 and 103, the second scribing units 120, 130, and 140 connected in parallel to the first scribing unit 100 divided into the unit liquid crystal display panels by six scribing processes.

Meanwhile, when only one of the second scribing units 120, 130, and 140 is applied, 18 scribing processes are required to be carried out to form the unit liquid crystal display panels from the first and second mother substrates 102 and 103 cut into the three equally divided parts by the first scribing unit 100. Thus, the processing time is delayed. Yet, in case all three of the second scribing units 120, 130, and 140 are connected in parallel to each other in the first embodiment of the present invention, the unit liquid crystal display panels 101 are separated from the three equally divided parts of the first and second mother substrates 102 and 103 through six scribing processes, as is the case of the first scribing unit 100. Thus, a time delay caused by a difference in the processing time between the first and second scribing units 100, 120, 130, and 140 can be avoided.

In the first embodiment according to the present invention, three of the scribing units are connected in parallel for the model having nine unit liquid crystal display panels formed on the first and second mother substrates. Moreover, in the first embodiment according to the present invention, two or at least four scribing units may also be connected in accordance with the number of the unit liquid crystal display panels formed on the first and second mother substrates.

Figure 6:
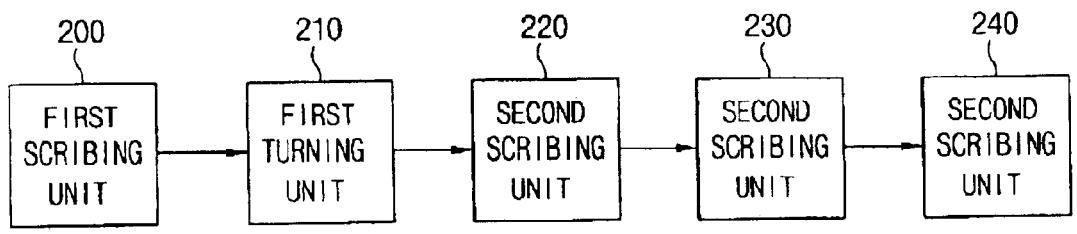
FIG. 6 illustrates a block diagram of an apparatus for cutting liquid crystal display panels according to a second embodiment of the present invention.

FIG. 6 illustrates a block diagram of an apparatus for cutting liquid crystal display panels according to a second embodiment of the present invention.

Referring to FIG. 6, an apparatus for cutting liquid crystal display panels according to the second embodiment of the present invention includes a first scribing unit 200 sequentially forming a first scribing line on the surfaces of first and second mother substrates having unit liquid crystal display panels and cutting the first and second mother substrates along the first scribing line, a first turning unit 210 turning the cut first and second mother substrates by 90°, and three second scribing units 220, 230, and 240 connected to the first turning unit 210 in series to cut the first and second mother substrates. The first and second mother substrates are cut by the first scribing unit 200, turned by the first turning unit 210, loaded in series to sequentially form a second scribing line on the surfaces of the first and second mother substrates, and separated along the second scribing line.

FIGS. 7A to 7D illustrate perspective views of a sequential process carried out in each block of FIG. 6.

Figure 7A:
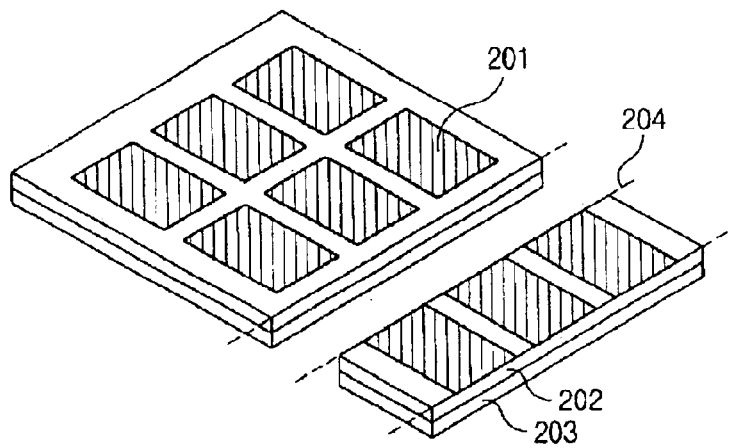
FIGS. 7A to 7D illustrate perspective views of a sequential process carried out in each block of FIG. 6.

Referring to FIG. 7A, the first scribing unit 200 sequentially forms the first scribing line 204 on the surfaces of the first and second mother substrates 202 and 203 having the unit liquid crystal display panels 201 formed thereon to be spaced apart from each other and cuts the first and second mother substrates 202 and 203 along the first scribing line 204.

For example, since the second embodiment of the present invention is related to a model having nine unit liquid crystal display panels 201 formed on the first and second mother substrates 202 and 203, the first scribing unit 200 divides the first and second mother substrates 202 and 203 into three equal parts through six scribing processes.

A plurality of thin film transistor array substrates (not shown) are formed on the first mother substrate 202 to be spaced apart from each other. A plurality of color filter substrates are formed on the second mother substrate 203 to be spaced apart from each other. And, the thin film transistor array substrates are bonded to the color filter substrates to face into each other, thereby forming a plurality of the unit liquid crystal display panels 201.

Meanwhile, each of the thin film transistor array substrates of the first mother substrate 202 is longer than that of each corresponding color filter substrate of the second mother substrate 203. This is because the gate and data pad parts are formed at the corresponding edges of the thin film transistor array substrate that does not overlap the corresponding color filter substrate.

Figure 7B:
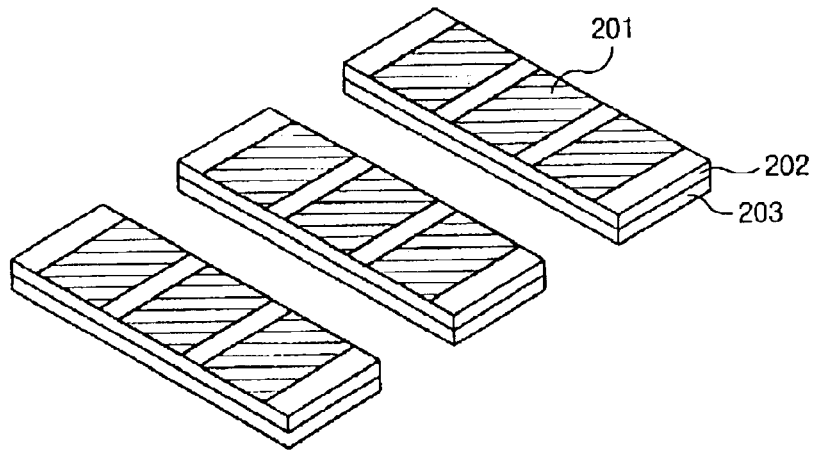

Referring to FIG. 7B, the first turning unit 210 sequentially turns each of the three equally divided parts of the first and second mother substrates 202 and 203 by 90°, which are the first scribing unit 200.

Figure 7C:
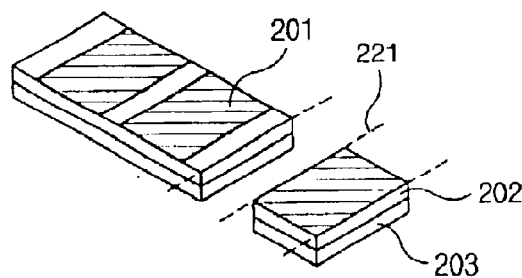

Referring to FIG. 7C, the first and second mother substrates 202 and 203, which are cut by the first scribing unit 200 and turned by 90° through the first turning unit 210, sequentially pass through the second scribing units 220, 230, and 240. The second scribing units 220, 230, and 240 then form a second scribing line 221 on the surfaces of the first and second mother substrates 202 and 203 and cut the first and second mother substrates 202 and 203 along the second scribing line 221 to separate three unit liquid crystal display panels 201, whereby nine unit liquid crystal display panels 201 are finally separated from the mother substrates.

Since the second embodiment of the present invention is related to a model having nine unit liquid crystal display panels formed on the first and second mother substrates 202 and 203, the second scribing units 220, 230, and 240 connected in series to the first scribing unit 200 separate the unit liquid crystal display panels 201 through six scribing processes.

Figure 7D:
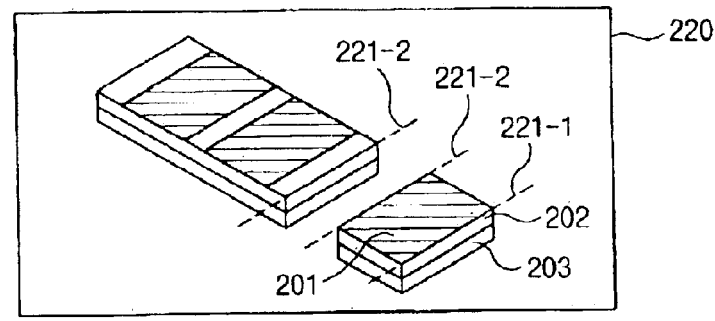
Figure 7D:
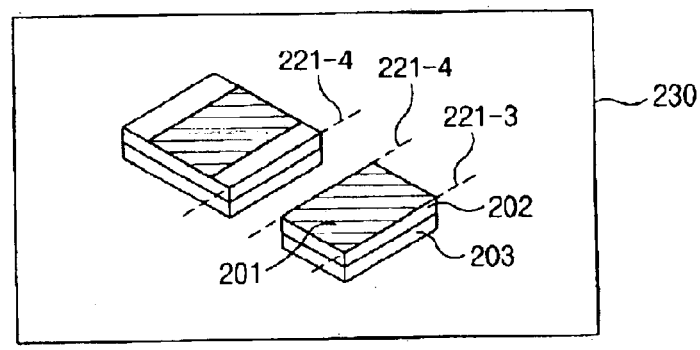
Figure 7D:
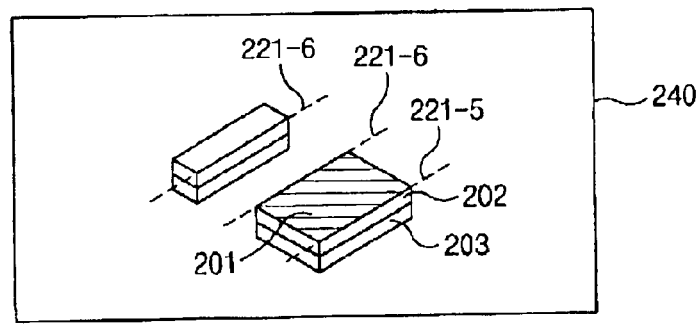

For instance, in FIG. 7D, when forming six second scribing lines 221-1 to 221-6, the first scribing unit 220 initially forms two of the second scribing lines 221-1 and 221-2 and cuts the first and second mother substrates 202 and 203 along the second cutting lines 221-1 and 221-2 to separate the unit liquid crystal display panels 201. The second scribing unit 230 forms the two subsequent second scribing lines 221-3 and 221-4 and cuts the first and second mother substrates 202 and 203 along the second scribing lines 221-3 and 221-4 to separate the unit liquid crystal display panels 201. And, the third scribing unit 240 forms the two final second scribing lines 221-5 and 221-6 and cuts the first and second mother substrates 202 and 203 along the second scribing lines 221-5 and 221-6 to separate the unit liquid crystal display panels 201.

In the second embodiment of the present invention, three of the second scribing units 220, 230, and 240 are connected in series. The unit liquid crystal display panels 201 are separated from the three equally divided parts of the first and second mother substrates 202 and 203 through six scribing processes, as is the case of the first scribing unit 200, thereby avoiding a time delay caused by a time difference in the processing between the first and second scribing units 200, 220, 230, and 240.

In the second embodiment according to the present invention, three of the second scribing units are connected in parallel for a model having nine unit liquid crystal display panels formed on the first and second mother substrates. Moreover, in the second embodiment according to the present invention, two or at least four scribing units may also be connected in accordance with the number of the unit liquid crystal display panels formed on the first and second mother substrates.

Accordingly, the apparatus for cutting the liquid crystal display panels according to the present invention connects at least two second scribing units in parallel or in series to prevent the time taken for the second scribing units from being delayed comparing to that of the first scribing unit, thereby improving productivity.

It will be apparent to those skilled in the art that various modifications and variations can be made in the apparatus for cutting liquid crystal display panels and the cutting method using the same of the present invention without departing from the spirit or scope of the inventions. Thus, it is intended that the present invention covers the modifications and variations of this invention provided they come within the scope of the appended claims and their equivalents.

What is claimed is:

1. An apparatus for cutting liquid crystal display panels, comprising:

a first scribing unit sequentially forming a plurality of first scribing lines on surfaces of first and second mother substrates having unit liquid crystal display panels and cutting the first and second mother substrates along the first scribing lines;

a first turning unit turning the cut first and second mother substrates by 90°; and at least two second scribing units sequentially forming a plurality of second scribing lines on the surfaces of the first and second mother substrates and cutting the first and second mother substrates along the second scribing lines.

2. The apparatus of claim 1, wherein the second scribing units are connected in series to the first turning unit.

3. The apparatus of claim 1, wherein the second scribing units are connected in parallel to the first turning unit.

4. A method for cutting liquid crystal display panels, comprising:

sequentially forming a plurality of first scribing lines on surfaces of first and second mother substrates having unit liquid crystal display panels;

cutting the first and second mother substrates along the first scribing lines;

turning the cut first and second mother substrates by 90°;

forming a plurality of second scribing lines on the surfaces of the first and second mother substrates; and cutting the first and second mother substrates along the second scribing lines using at least two second scribing units.

5. The method of claim 4, wherein the at least two second scribing units simultaneously form the plurality of second scribe lines on the surfaces of the first and second mother substrates.

6. The method of claim 4, wherein the at least two second scribing units sequentially form the plurality of second scribe lines on the surfaces of the first and second mother substrates.

* * * * *